US012359462B2

(12) United States Patent
Huang

(10) Patent No.: US 12,359,462 B2
(45) Date of Patent: Jul. 15, 2025

(54) LOCK CASE INTERLOCKABLE WITH AN ANTI-THEFT LATCH

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 492 days.

(21) Appl. No.: 17/991,956

(22) Filed: Nov. 22, 2022

(65) Prior Publication Data

US 2024/0159080 A1 May 16, 2024

(30) Foreign Application Priority Data

Nov. 10, 2022 (TW) .................................. 111142966

(51) Int. Cl.

| | |
|---|---|
| ***E05B 17/20*** | (2006.01) |
| ***E05B 55/00*** | (2006.01) |
| ***E05B 63/00*** | (2006.01) |
| ***E05B 63/08*** | (2006.01) |
| ***E05C 1/08*** | (2006.01) |

(52) U.S. Cl.

CPC .......... *E05B 17/2053* (2013.01); *E05B 55/00* (2013.01); *E05B 63/0017* (2013.01); *E05B 63/08* (2013.01); *E05C 1/08* (2013.01)

(58) Field of Classification Search

CPC .. E05B 63/0069; E05B 13/002; E05B 13/108; E05B 27/02; E05B 47/0012; E05B 2047/0016; E05B 17/044; E05B 55/06; E05B 2047/0086; E05B 47/0692; E05B 2047/0031; G07C 9/00944

See application file for complete search history.

(56) References Cited

U.S. PATENT DOCUMENTS

| | | | |
|---|---|---|---|
| 6,177,771 | B1 | 1/2001 | Kinzer et al. |
| 6,634,140 | B1 | 10/2003 | Sellman |
| 6,786,006 | B2 | 9/2004 | Kowalczyk et al. |
| 6,891,479 | B1 | 5/2005 | Eccleston |
| 7,051,403 | B2 | 5/2006 | Homberg |
| 7,061,197 | B1 | 6/2006 | Mullet et al. |
| 7,068,179 | B2 | 6/2006 | Snell et al. |
| 7,143,547 | B2 | 12/2006 | Liles, Jr. |
| 7,234,201 | B2 | 6/2007 | Brown et al. |
| 7,282,883 | B2 | 10/2007 | Mullet et al. |

(Continued)

FOREIGN PATENT DOCUMENTS

| | | | |
|---|---|---|---|
| EP | 3550528 | A1 | 9/2019 |
| KR | 20210019168 | A | 2/2021 |

(Continued)

*Primary Examiner* — Kristina R Fulton

*Assistant Examiner* — Thomas L Neubauer

(74) *Attorney, Agent, or Firm* — Ying-Ting Chen; Law Office of Michael Chen

(57) ABSTRACT

A lock case interlockable with an anti-theft latch is mounted on a door. The lock case includes a latch coupled with a latch hole in a door frame for retaining the door in a closed position. The anti-theft latch can be operated to engage with the door frame. When the latch is picked, the anti-theft latch still remains engaged with the door frame to prevent opening of the door. When normally operated, an inner operating device or an outer operating device can be operated to disengage the latch from the latch hole while disengaging the anti-theft latch from the door frame, permitting easy, convenient opening of the door.

18 Claims, 10 Drawing Sheets

(56) References Cited

U.S. PATENT DOCUMENTS

| | | | |
|---|---|---|---|
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,248,005 | B2 | 8/2012 | Romer |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,547,046 | B2 | 10/2013 | Burris et al. |
| 8,601,744 | B2 | 12/2013 | Wildforster et al. |
| 8,695,277 | B2 | 4/2014 | Romer et al. |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,869,117 | B2 | 1/2018 | Houser et al. |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,344,502 | B2 | 7/2019 | McKibben et al. |
| 10,415,301 | B2 | 9/2019 | Kuan |
| 10,458,151 | B1 | 10/2019 | Shen |
| 10,472,873 | B2 | 11/2019 | Ladha et al. |
| 10,559,151 | B2 | 2/2020 | Kvinge et al. |
| 10,704,310 | B1 | 7/2020 | Barbon et al. |
| 10,704,313 | B2 | 7/2020 | Houser et al. |
| 10,724,288 | B2 | 7/2020 | Baumgarte |
| 2005/0154612 | A1 | 7/2005 | Smith et al. |
| 2007/0256362 | A1 | 11/2007 | Hansen |
| 2013/0009785 | A1 | 1/2013 | Finn et al. |
| 2014/0255252 | A1 | 9/2014 | Stratman et al. |
| 2014/0282934 | A1 | 9/2014 | Miasnik et al. |
| 2016/0348415 | A1 | 12/2016 | Baumgarte |
| 2018/0334841 | A1 | 11/2018 | Langenberg et al. |
| 2019/0043296 | A1 | 2/2019 | Baumgarte et al. |
| 2019/0145138 | A1 | 5/2019 | Eickhoff |
| 2019/0153764 | A1 | 5/2019 | Baumgarte |
| 2019/0264486 | A1 | 8/2019 | Toloday et al. |
| 2019/0319557 | A1 | 10/2019 | Dye et al. |
| 2019/0338576 | A1 | 11/2019 | Wang |
| 2019/0345738 | A1 | 11/2019 | McKibben et al. |
| 2019/0383080 | A1 | 12/2019 | Barbon et al. |
| 2020/0037142 | A1 | 1/2020 | Lofton |
| 2020/0190885 | A1 | 6/2020 | Coleman |
| 2020/0256108 | A1 | 8/2020 | Shetty et al. |
| 2020/0327758 | A1 | 10/2020 | Ma et al. |
| 2021/0012598 | A1 | 1/2021 | Giebat et al. |
| 2021/0023248 | A1 | 1/2021 | Townsend et al. |
| 2021/0056791 | A1 | 2/2021 | Shen |

FOREIGN PATENT DOCUMENTS

| | | | |
|---|---|---|---|
| KR | 20210033154 | A | 3/2021 |
| WO | 2021007588 | A1 | 1/2021 |
| WO | 2021050616 | A1 | 3/2021 |
| WO | 2021214134 | A1 | 10/2021 |

LOCK CASE INTERLOCKABLE WITH AN ANTI-THEFT LATCH

BACKGROUND OF THE INVENTION

The present invention relates to a lock case interlockable with an anti-theft latch and, more particularly, to an anti-theft latch which can retract from an anti-theft position to a non-anti-theft position while moving a latch to a retracted, unlatching position.

A lock case currently available on the market can be mounted inside a door and includes a latch and an anti-theft latch which can operate separately from the latch. The latch is coupled with a latch hole in a door frame around the door in a closed position, preventing opening of the door. The lock case is operatively connected to inner and outer operating devices which are mounted on two sides of the door. When the anti-theft latch is in a retracted, non-anti-theft position, the inner and outer operating devices can actuate the latch to move to a retracted, unlatching position permitting opening of the door. The anti-theft latch can be moved to an anti-theft position engaged with an anti-theft hole of the door frame through additional operation. When the anti-theft latch is in the anti-theft position, even if the inner and outer operating devices are used to move the latch to the unlatching position, the door is still restricted by the anti-theft latch and, thus, cannot be opened. In this case, even though a person at the indoor side intends to open the door, the person must move the anti-theft latch to the non-anti-theft position and operate the inner operating device to move the latch to the unlatching position for opening the door, causing inconvenience in use.

BRIEF SUMMARY OF THE INVENTION

To overcome the above drawback, in an aspect, the present invention provides a lock case comprising:

- a case body;
- a latch movably coupled to the case body and movable between a latching position and an unlatching position;
- an interlocking member operatively coupled with the latch and including a push wall, wherein the push wall includes an upper end and a lower end;
- an anti-pick member pivotably mounted to the case body and including a first abutting portion, wherein the anti-pick member is pivotable between an anti-pick position and a non-anti-pick position;
- an anti-pick latch movably coupled to the case body and operatively connected to the anti-pick member, wherein the anti-pick latch is movable between an extended position and a retracted position, wherein when the anti-pick latch is in the extended position, the first abutting portion is spaced from the push wall of the interlocking member, and the anti-pick member remains in the non-anti-pick position, and wherein when the anti-pick latch is in the retracted position, the first abutting portion abuts against the push wall, and the anti-pick member is pivotable to the anti-pick position or the non-anti-pick position;
- a connecting member pivotably connected to the case body and operatively connected to the interlocking member, wherein pivotal movement of the connecting member actuates the interlocking member and the latch to move jointly between the latching position and the unlatching position, wherein when the latch is in the latching position and the anti-pick latch is in the retracted position, the anti-pick member is in the anti-pick position and the first abutting portion abuts the lower end of the push wall, wherein when the latch is in the latching position and the anti-pick latch is in the retracted position, the anti-pick member is in the non-anti-pick position and the first abutting portion abuts the upper end of the push wall, and wherein with the anti-pick member in the anti-pick position and the connecting member not pivoted, the interlocking member remains unmoved when the latch is picked to move from the latching position towards the unlatching position, such that the anti-pick member remains in the anti-pick position, preventing the latch from moving from the latching position to the unlatching position;
- an anti-pick latch movably coupled to the case body and movable between an anti-theft position and a non-anti-theft position;
- an unlocking spring disposed in the case body and biasing the anti-theft latch towards the non-anti-theft position;
- a slidable locking block movably coupled to the case body, wherein with the slidable locking block engaged with the anti-theft latch, the slidable locking block retains the anti-theft latch in the anti-theft position or the non-anti-theft position, wherein with the slidable locking block disengaged from the anti-theft latch 86, the anti-theft latch is permitted to move to the anti-theft position or the non-anti-theft position;
- an intermediate member pivotably mounted in the case body and interlocked with the connecting member; and
- an unlocking member interlocked with the intermediate member and operatively connected to the slidable locking block, wherein when the connecting member pivots and the latch moves from the latching position to the unlatching position, the unlocking member actuates the slidable locking block to disengage from the anti-theft latch, and the unlocking spring biases the anti-theft latch to move from the anti-theft position to the non-anti-theft position.

By provision of the unlocking member interlocked with the intermediate member and the connecting member and cooperation of the unlatching spring, when the outer operating device (which can interlock with the lock case only when in the unlocked state) or the inner operating device to open the door, the latch is moved to the unlatching position while the anti-theft latch is moved to the non-anti-theft position, which does not require separate operation for moving the anti-theft latch to the non-anti-theft position, providing convenient use.

In an example, the lock case further comprises a first spring. The latch includes a rod extending therefrom. First, second, and third retaining rings are disposed on the rod. The second retaining ring is disposed between the first retaining ring and the third retaining ring. The first spring is disposed between the first retaining ring and the case body and biases the latch to the latching position. The interlocking member further includes first and second ends slidably coupled with the rod. The first end of the interlocking member is located between the second and third retaining rings, and abuts the second retaining ring. The second end of the interlocking member is disposed between the first and second retaining rings and abuts the connecting member. When the interlocking member moves towards the first retaining ring, the first end of the interlocking member presses against the second retaining ring to move the latch from the latching position to the unlatching position. With the connecting member not pivoted and the anti-pick member in the anti-pick position, when the latch is picked to move from the latching position to the unlatching position, the second retaining ring moves away from the first end of the interlocking member, such that the interlocking member remains unmoved to reliably retain the anti-pick member in the anti-pick position.

In an example, the lock case further comprises a second spring disposed between the second end of the interlocking member and the first retaining ring. The second spring biases the interlocking member. With the anti-pick member in the anti-pick position and the connecting member not pivoted, when the latch is picked to move from the latching position towards the unlatching position, movement of the first retaining ring compresses the first spring, the second spring keeps the second end of the interlocking member to abut against the connecting member without movement, reliably retaining the anti-pick member in the anti-pick position.

The first spring is used to return the latch from the lathing position to the unlatching position. By cooperating with the second spring biasing the second end of the interlocking member, the latch can move independently relative to the connecting member, and the relative position between the latch and the connecting member can be retained during joint movement thereof. This further assures that the anti-pick member can be moved to the anti-pick position or the non-anti-pick position at the proper time.

In an example, the lock case further comprises:

an unlatching rod including a push portion, a driven portion, and a coupling portion between the push portion and the driven portion, wherein the push portion is adjacent to the interlocking member, and wherein the coupling portion is operatively connected to the anti-theft latch; and a locking operation device mounted to the case body and including a push block operatively connected to a lock core, wherein when the anti-theft latch is in the anti-theft position, the driven portion of the unlatching rod is outside of the rotational path of the push block, wherein when the anti-theft latch is in the non-anti-theft position, the driven portion of the unlatching rod is on the rotational path of the push block, wherein with the anti-theft latch in the non-anti-theft position and the connecting member remained unmoved, when the lock core is unlocked and drives the push block to pivot in the first direction, the driven portion of the unlatching rod is pressed, and the push portion of the unlatching rod presses against and actuates the interlocking member to thereby move the latch from the latching position to the unlatching position, wherein with the anti-theft latch in the non-anti-theft position and the connecting member remained unmoved, when the lock core is unlocked and drives the push block to pivot in a second direction reverse to the first direction, the sliding locking block is actuated to disengage from the anti-theft latch, and the anti-theft latch moves from the non-anti-theft position to the anti-theft position, and wherein with the anti-theft latch in the anti-theft position and the connecting member remained unmoved, when the lock core is unlocked and drives the push block to pivot in the first direction, the slidable locking block disengages from the anti-theft latch, and the anti-theft latch moves from the anti-theft position to the non-anti-theft position.

In an example, the lock case further comprises a third spring. The anti-pick member further includes a second abutting portion spaced from the first abutting portion. The third spring is disposed between the second abutting portion and the case body and biases the anti-pick member towards the anti-pick position.

In an example, the anti-pick member further includes an interlocking end. The anti-pick latch further includes a follower member having a limiting wall. When the anti-pick latch is in the extended position, the limiting wall abuts against the interlocking end to remain the anti-pick member in the anti-pick position, and the first abutting portion is spaced from the push wall. When the anti-pick latch is in the retracted position, the limiting wall is spaced from the interlocking end, and the first abutting portion abuts the first wall.

In an example, the lock case further comprises: a locking operation device mounted to the case body, wherein the locking operating device includes a push block, wherein the slidable locking block includes a bottom end adjacent to the push block, wherein the anti-theft latch further includes an extension portion, wherein the extension portion includes a side having a recession and a latching groove, wherein the extension portion further includes another side having an actuating groove, wherein the slidable locking block further includes an engaging portion selectively coupled with one of the recession and the latching groove, wherein when the anti-theft latch is in the non-anti-theft position and the push block rotates in the second direction, the push block presses against the bottom end of the slidable locking block to move the slidable locking block to a position in which the engaging portion disengage from the recession, the unlocking member, the intermediate member, and the connecting member remain unmoved, and the anti-theft latch moves from the non-anti-theft position to the anti-theft position, wherein when the anti-theft latch is in the anti-theft position and the push block rotates in the first direction, the push block presses against the bottom end of the slidable locking block to move the slidable locking block to a position in which the engaging portion disengage from the latching groove, the unlocking member, the intermediate member, and the connecting member remain unmoved, and the anti-theft latch moves from the anti-theft position to the non-anti-theft position, wherein when the anti-theft latch is in the anti-theft position and the connecting member pivots to move the latch to the unlatching position, the engaging portion disengages from the latching groove to move the anti-theft latch from the anti-theft position to the non-anti-theft position.

In an example, the extension portion further includes a protrusion, and the unlatching spring is disposed between the case body and the protrusion.

In an example, the connecting member includes an interlocking portion on an outer periphery thereof. The intermediate member further includes a first toothed portion and a second toothed portion spaced from the first toothed portion in a circumferential direction about a pivotal axis of the intermediate member. The unlocking member includes a meshing portion meshed with the second toothed portion. The unlocking member further includes an actuating end adjacent to the engaging portion. When the connecting member pivots and the latch moves from the latching position to the unlatching position, the interlocking portion pushes the first toothed portion to pivot the intermediate member, the second toothed portion actuates the meshing portion to pivot the unlocking member, and the actuating end actuates the engaging portion to disengage from the recession or the latching groove. When the connecting member pivots and the latch moves from the unlatching position to the latching position, the engaging portion moves to a position engaged with the recession.

In an example, the connecting member further includes a stop portion spaced from the interlocking portion in a circumferential direction about a pivotal axis of the connecting member. When the latch is in the latching position and the connecting member does not pivot, the stop portion abuts against the first toothed portion of the intermediate member, the interlocking portion is spaced from the first toothed portion in the circumferential direction about the pivotal axis of the connecting member. During movement of the latch from the latching position to the unlatching position caused by pivotal movement of the connecting member, the intermediate member pivots after the interlocking portion presses against the first toothed portion.

In an example, the lock case further comprises a positioning spring disposed in the case body. The positioning spring biases the engaging portion of the slidable locking block to retain in a position engaged with the recession or the latching groove.

In another aspect, the lock case comprises:

a case body;

a latch movably coupled to the case body and movable between a latching position and an unlatching position;

a connecting member pivotably connected to the case body, wherein pivotal movement of the connecting member actuates the latch to move between the latching position and the unlatching position, an anti-theft latch movably coupled to the case body and movable between an anti-theft position and a non-anti-theft position;

an unlocking spring disposed in the case body and biasing the anti-theft latch towards the non-anti-theft position;

a slidable locking block movably coupled to the case body, wherein when the slidable locking block engages with the anti-theft latch, the slidable locking block retains the anti-theft latch in the anti-theft position or the non-anti-theft position, wherein when the slidable locking block disengages from the anti-theft latch, the anti-theft latch is movable from the anti-theft position to the non-anti-theft position or from the non-anti-theft position to the anti-theft position;

an intermediate member pivotably mounted in the case body and interlocked with the connecting member; and an unlocking member interlocked with the intermediate member and operatively connected to the slidable locking block, wherein when the connecting member pivots and the latch moves from the latching position to the unlatching position, the intermediate member actuates the unlocking member to pivot, which, in turn, actuates the slidable locking block to disengage from the anti-theft latch, wherein when the anti-theft latch is in the anti-theft position, the unlocking spring biases the anti-theft latch to move from the anti-theft position to the non-anti-theft position, wherein when the connecting member pivots and the latch moves from the unlatching position to the latching position, the slidable locking block moves to a position engaged with the anti-theft latch to retain the anti-theft latch in the non-anti-theft position.

The present invention will become clearer in light of the following detailed description of illustrative embodiments of this invention described in connection with the drawings.

Figure 1:
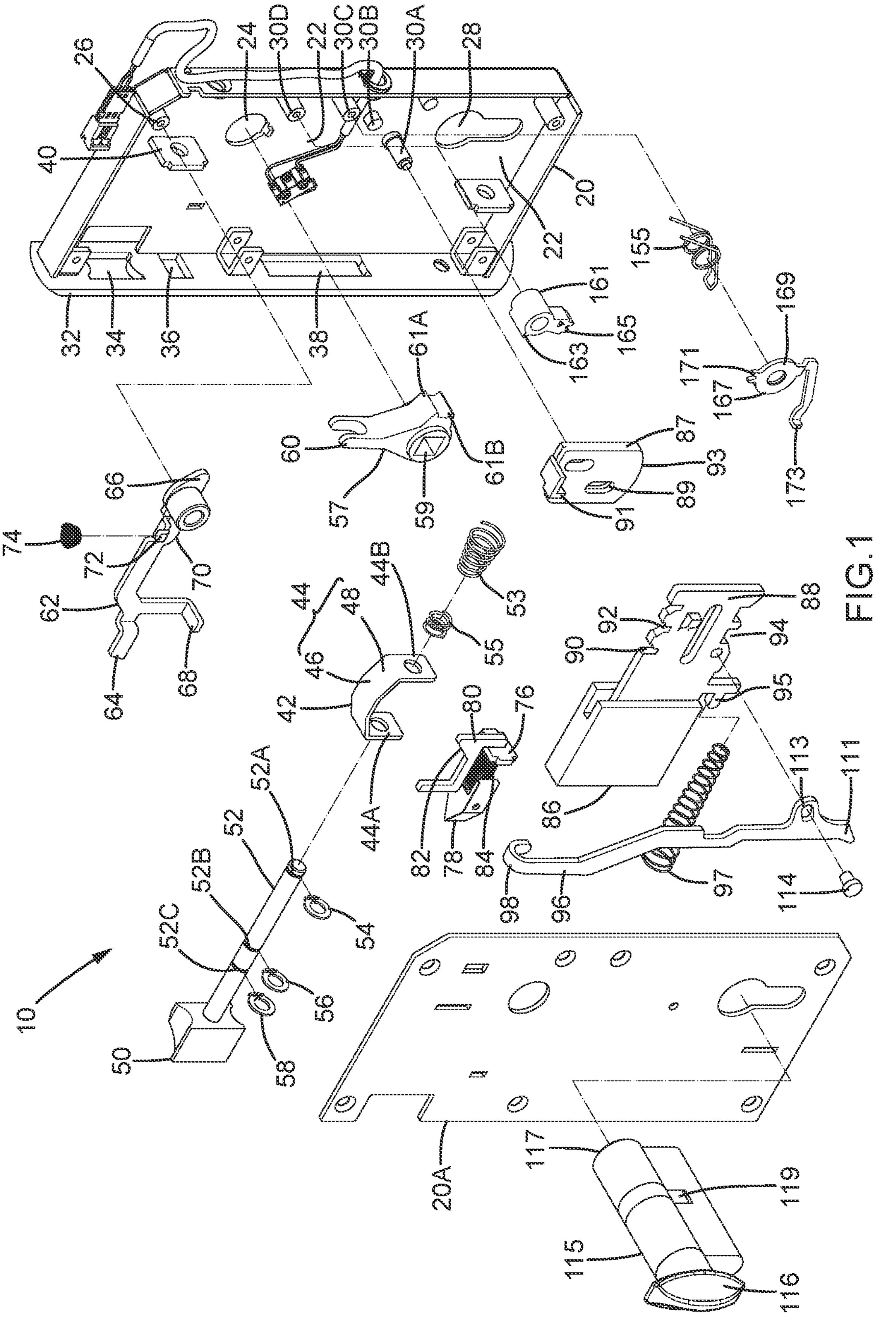
FIG. 1 is an exploded, perspective view of a lock case of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, w % ben the terms “first”, “second”, “third”, “fourth”, “lower”, “upper”. “inner”, “outer”, “side”, “end”, “portion”, “axial”, “annular”, “spacing”, “clockwise”, “counterclockwise”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
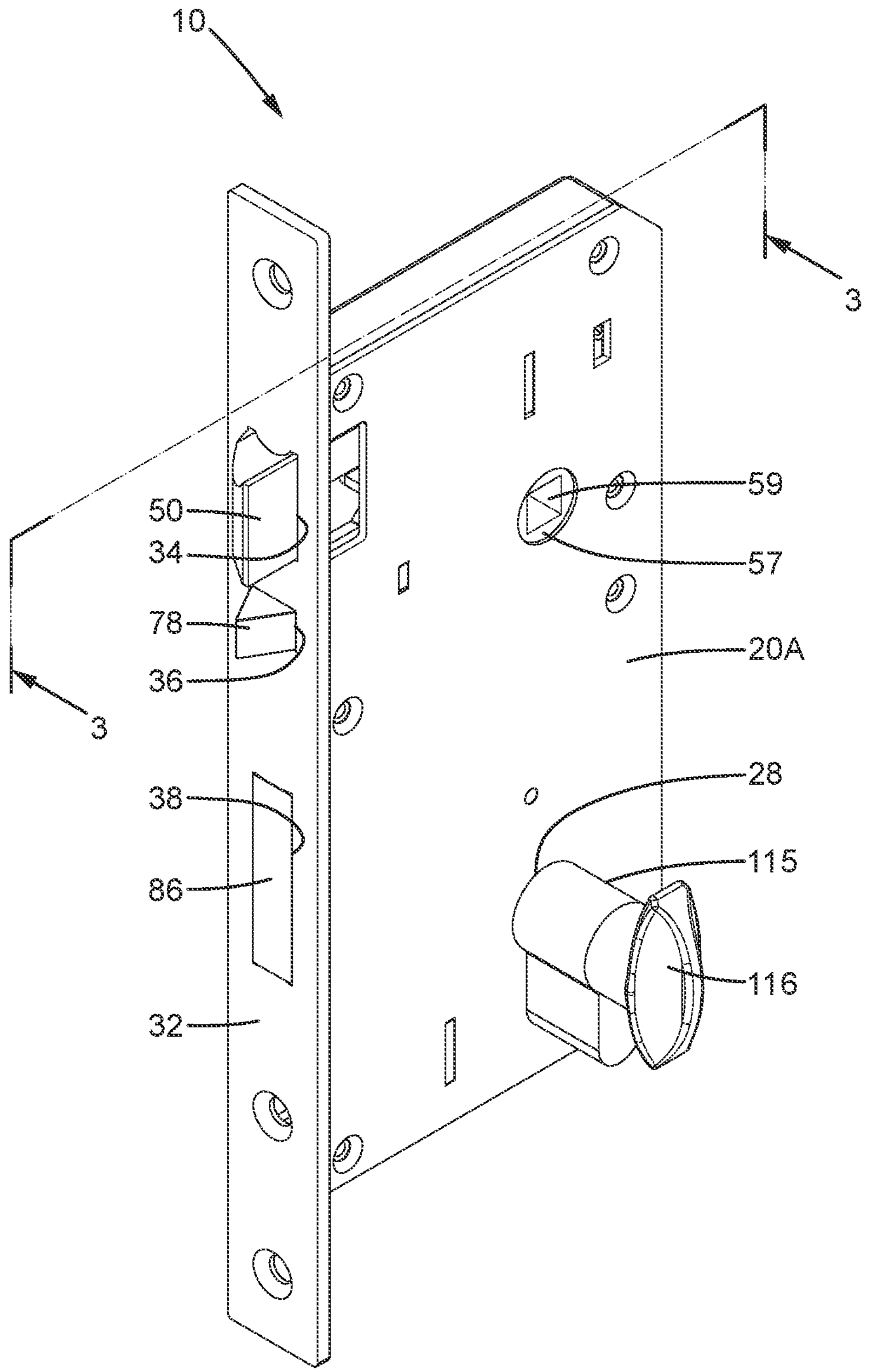
FIG. 2 is a perspective view of the lock case of FIG. 1 after assembly.
Figure 3:
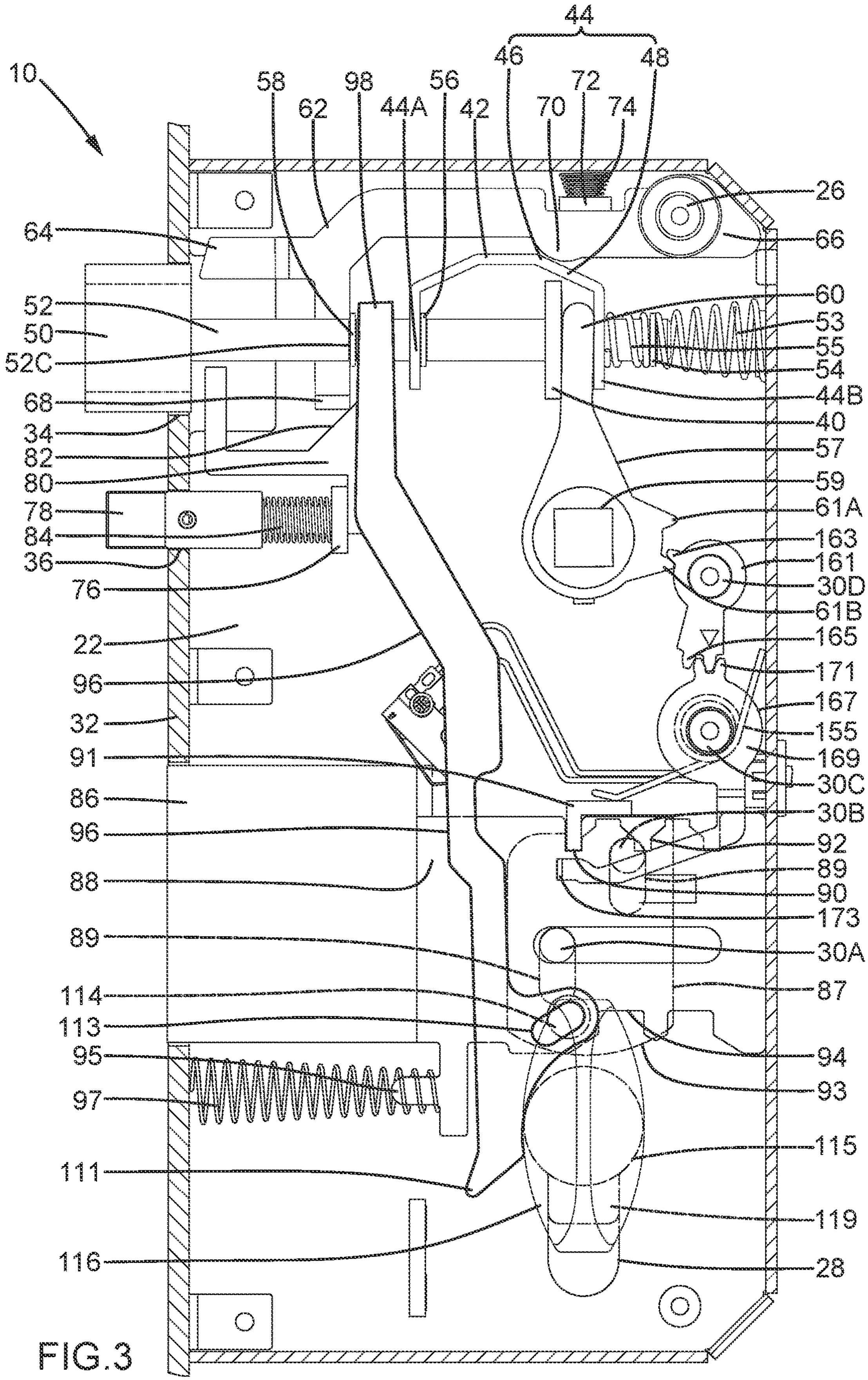
FIG. 3 is a cross sectional view taken along section line 3-3 of FIG. 2.

The present invention relates to a lock case 10 which can be mounted in a door 130 to retain the door 130 in a closed position. With reference to FIGS. 1-3, the lock case 10 includes a case body 20 having a bottom wall 22, an end plate 32 extending perpendicularly to the bottom wall 22, and a lid 20A opposite to the bottom wall 22. First and second pivotal portions 24 and 26 are formed on the bottom wall 22 and spaced from each other. The first pivotal portion 24 can be in the form of a cylindrical hole, and the second pivotal portion 26 can be in the form of a cylinder. A first limiting member 30A, a second limiting member 30B, a third limiting member 30C, a fourth limiting member 30D, and a lock core hole 28 are disposed on the bottom wall 22 of the case body 20. Each of the first, second, third, and fourth limiting members 30A, 30B, 30C, and 30D can be in the form of a cylinder. Furthermore, the second limiting member 30B is located between the first and third limiting member 30A and 30C, and the third limiting member 30C is located between the second and fourth limiting members 30B and 30D.

The end plate 32 includes a first hole 34, a second hole 36, and a third hole 38. The second hole 36 is located between the first hole 34 and the third hole 38.

The lock case 10 further includes a latch 50 slidably mounted to the case body 20 and a first supporting member 40. The latch 50 includes a rod 52 extending from an end face thereof. A first engaging groove 52A, a second engaging groove 52B, and a third engaging groove 52C are formed on an outer periphery of the rod 52 and can be in the form of annular grooves.

Figure 9:
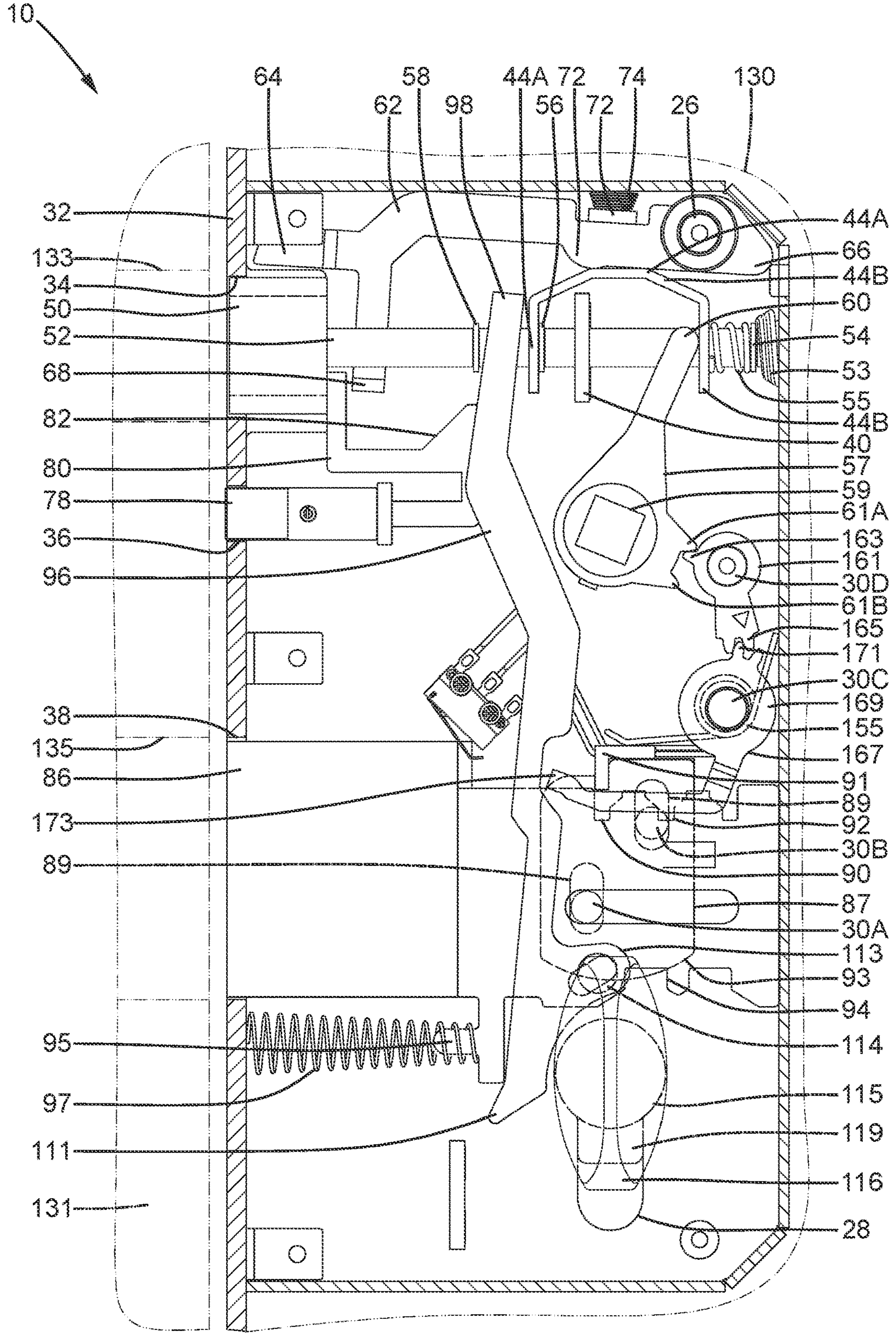
FIG. 9 is a cross sectional view of the lock case with the inner or outer operating device operated to move the latch to an unlatching position and with the anti-theft latch moved to a non-anti-theft position.
Figure 10:
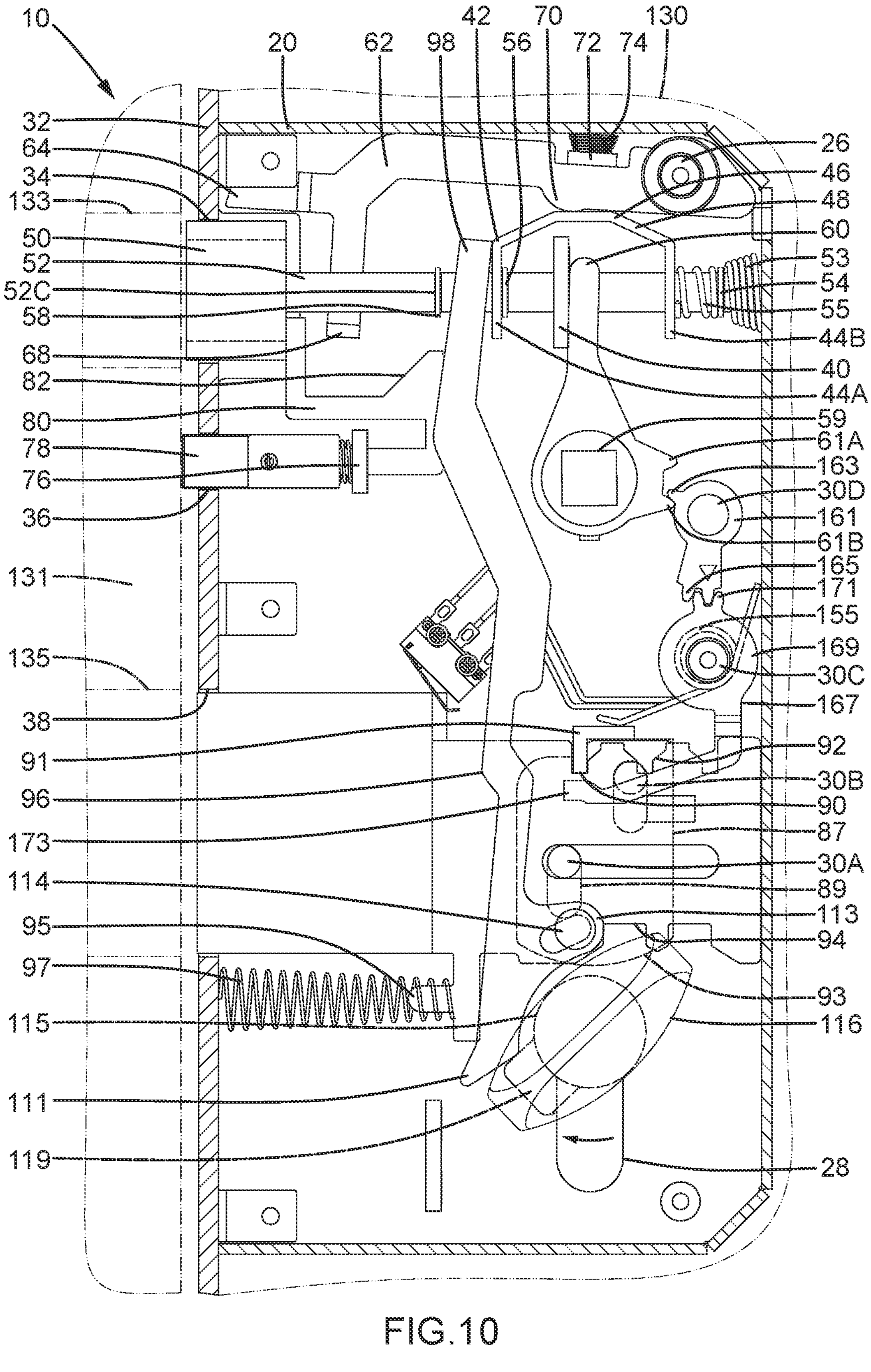
FIG. 10 is a cross sectional view of the lock case with an unlatching rod pushed by pivotal movement of the locking operation device in a first direction to move the latch to the unlatching position.

The first supporting member 40 is substantially in the form of a piece with a hole. The first supporting member 40 is securely mounted on the bottom wall 22 of the case body 20. The latch 50 slidably extends through the first hole 34, and the rod 52 slidably extends through the first supporting member 40, such that the latch 50 is movable in an axial direction of the rod 52 between a latching position (FIG. 3) and an unlatching position (FIGS. 9 and 10). The extent of the latch 50 in the latching position protruding beyond the end plate 32 is greater than that of the latch 50 in the unlatching position protruding beyond the end plate 32.

A first retaining ring 54 is disposed in the first engaging groove 52A. A second retaining ring 56 is disposed in the second engaging groove 52B. A third retaining ring 58 is disposed in the third engaging groove 52C. The first supporting member 40 is substantially located between the first and second retaining rings 54 and 56.

The lock case 10 further includes an interlocking member 42 jointly movable with the latch 50 and a connecting member 57 pivotably connected to the case body 20. The interlocking member 42 includes a push wall 44 having an upper end 46 and a lower end 48 that is inclined relative to the upper end 46. The interlocking member 42 further includes a first end 44A and a second end 44B spaced from the first end 44A in the axial direction of the rod 52. The second end 44B is connected to the lower end 48.

The rod 52 of the latch 50 slidably extends through the first and second ends 44A and 44B of the interlocking member 42. The first end 44A is located between the second and third retaining rings 56 and 58 and abuts the second retaining ring 56. The second end 44B is located between and spaced from the first retaining ring 54 and the first supporting member 40.

A first spring 53 and a second spring 55 are disposed between the latch 50 and the case body 20. The first spring 53 is disposed between the first retaining ring 54 and the case body 20 and biases the latch 50 towards the latching position through the first retaining ring 54. The second spring 55 is disposed between the second end 44B of the interlocking member 42 and the first retaining ring 54 and biases the interlocking member 42 towards the latching position.

The connecting member 57 includes a connecting hole 59 coaxial with the rotating axis of the connecting member 57. The connecting member 57 further includes a push end 60 eccentric to the connecting hole 59. The connecting member 57 further includes an interlocking portion 61A and a stop portion 61B which are spaced from the push end 60 in a circumferential direction about a pivotal axis of the connecting member 57. The interlocking portion 61A is located between the push end 60 and the stop portion 61B in the circumferential direction about the pivotal axis of the connecting member 57. The connecting member 57 is pivotably connected to the first pivotal portion 24 of the case body 20. The push end 60 is located between the second end 44B of the interlocking member 42 and the first supporting member 40. Since the second end 44B of the interlocking member 42 is biased by the second spring 55, the connecting member 57 is biased, such that the push end 60 abuts both the first supporting member 40 and the second end 44B of the interlocking member 42, as shown in FIG. 3.

The lock case 10 further includes an anti-pick member 62 pivotably connected to the case body 20. The anti-pick member 62 includes an abutting end 64 and a pivotal end 66 spaced from the abutting end 64 in a direction parallel to the axial direction of the rod 52. The anti-pick member 62 further includes first and second abutting portions 70 and 72 between the abutting end 64 and the pivotal end 66. The anti-pick member 62 further includes an interlocking end 68 between the abutting end 64 and the first abutting portion 70. The pivotal end 66 of the anti-pick member 62 is pivotably connected to the second pivotal portion 26 of the case body 20. The first abutting portion 70 faces the push wall 44 of the interlocking member 42, and the abutting end 64 faces the latch 50. The anti-pick member 62 is pivotable about a pivoting axis defined by the second pivotal portion 26 between an anti-pick position (FIG. 4) and a non-anti-pick position (FIG. 3). A third spring 74 is disposed between the second abutting portion 72 of the anti-pick member 62 and the case body 20 and biases the anti-pick member 62 towards the anti-pick position.

Figure 4:
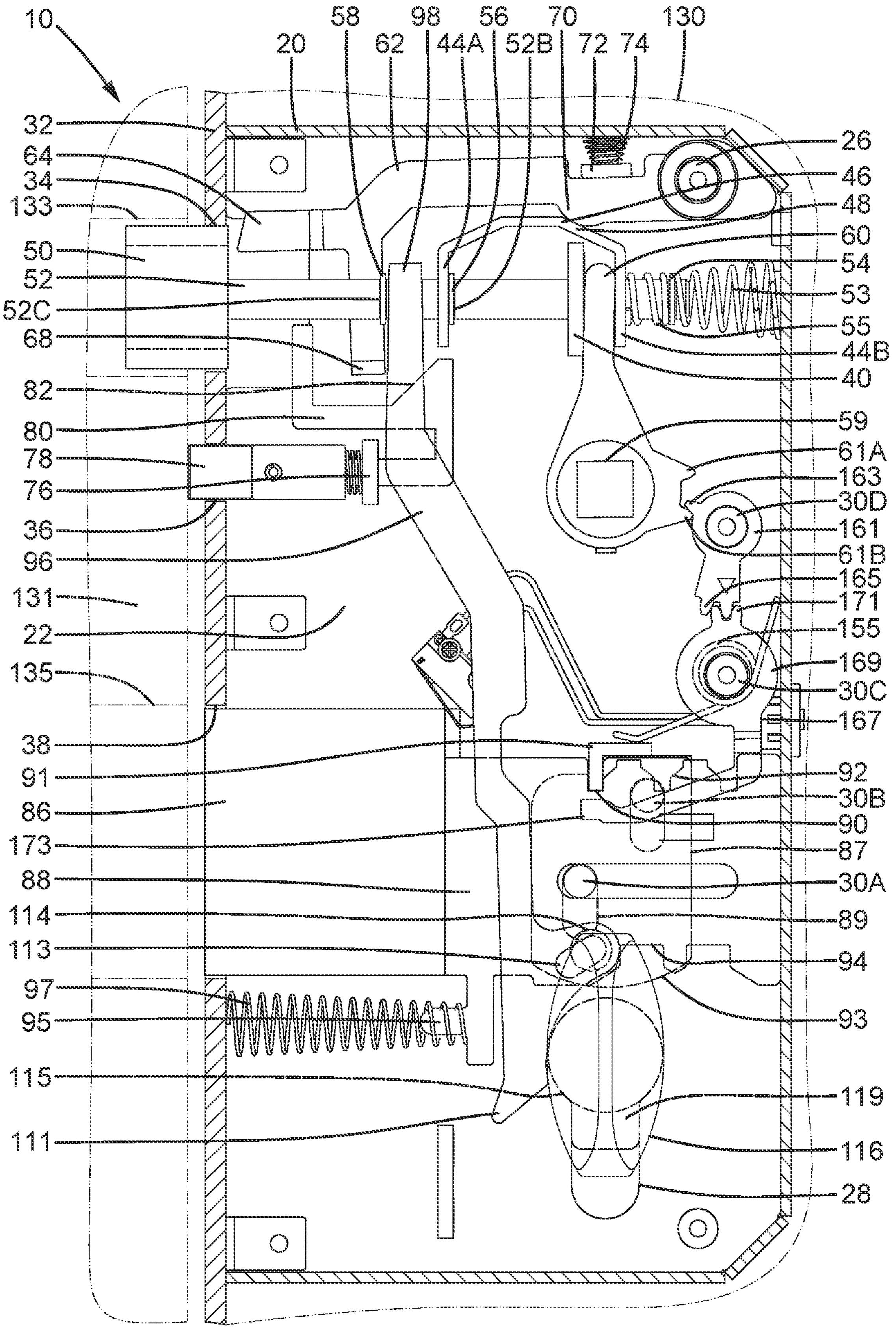
FIG. 4 is a cross sectional view of the lock case mounted in a door in a closed position.

The lock case 10 further includes an anti-pick latch 78 slidably coupled to the case body 20 and a second supporting member 76. The second supporting member 76 can be in the form of a piece fixed on the bottom wall 22 of the case body 20. The anti-pick latch 78 includes a follower member 80 slidably coupled to the second supporting member 76 and is slidably couple with the second hole 36. Thus, the anti-pick latch 78 is movable between an extended position (FIG. 3) and a retracted position (FIG. 4). An extent of the anti-pick latch 78 in the extended position protruding beyond the end plate 32 is greater than that of the anti-pick latch 78 in the retracted position protruding beyond the end plate 32. A fourth spring 84 is disposed between the anti-pick latch 78 and the second supporting member 76 and biases the anti-pick latch 78 towards the extended position.

The lock case 10 further includes a slidable locking block 87 and an anti-theft latch 86, which are slidably coupled to the case body 20. The slidable locking block 87 includes two sliding grooves 89 and a bottom end 93 below the two sliding grooves 89. The slidable locking block 87 further includes an engaging portion 91 spaced from the bottom end 93. The first and second limiting members 30A and 30B are slidably received in the two sliding grooves 89, assuring that the slidable locking block 87 can move rectilinearly relative to the case body 20.

The lock case 10 further includes an intermediate member 161 pivotably connected to the fourth limiting member 30D of the case body 20. The intermediate member 161 includes a first toothed portion 163 and a second toothed portion 165 spaced from the first toothed portion 163 in a circumferential direction about a pivotal axis of the intermediate member 161. The first toothed portion 163 of the intermediate member 161 is located between the interlocking portion 61A and the stop portion 61B of the connecting member 57. With reference to FIG. 3, when the push end 60 of the connecting member 57 abuts against the first supporting member 40, the stop portion 61B abuts against the first toothed portion 163 of the intermediate member 161.

The lock case 10 further includes an unlocking member 167 slidably coupled with the case body 20. The unlocking member 167 includes a main body 169, a meshing portion 171 and an actuating end 173, with the meshing portion 171 and the actuating end 173 extending from the main body 169 and spaced from each other.

The main body 169 of the unlocking member 167 is pivotably connected to the third limiting member 30C. The actuating end 173 is adjacent to the engaging portion 91 of the slidable locking block 87. The meshing portion 171 of the unlocking member 167 meshes with the second toothed portion 165 of the intermediate member 161. Thus, pivotal movement of the connecting member 57 causes pivotal movement of the intermediate member 161, which, in turn, causing pivotal movement of the unlocking member 167. Furthermore, movement of the unlocking member 167 actuates the slidable locking block 87 to move.

The anti-theft latch 86 includes an extension portion 88. A recession 90 and a latching groove 92 are formed on an upper side of the extension portion 88. An actuating groove 84 and a protrusion 95 are formed on a lower side of the extension portion 88.

The anti-theft latch 86 is slidably received in the case body 20 and is slidably coupled with the first limiting member 30A and the third hole 38. The anti-theft latch 86 is movable between an anti-theft position (FIG. 7) and a non-anti-theft position (FIGS. 3 and 4). An unlocking spring 97 is disposed between the protrusion 95 of the anti-theft latch 86 and the end plate 32. The unlocking spring 97 biases the anti-theft latch 86 towards the non-anti-theft position. The slidable locking block 87 is located between the bottom wall 22 of the case body 20 and the extension portion 88 of the anti-theft latch 86. The engaging portion 91 of the slidable locking block 87 is disengagably coupled with the recession 90 or the latching groove 92.

Figure 7:
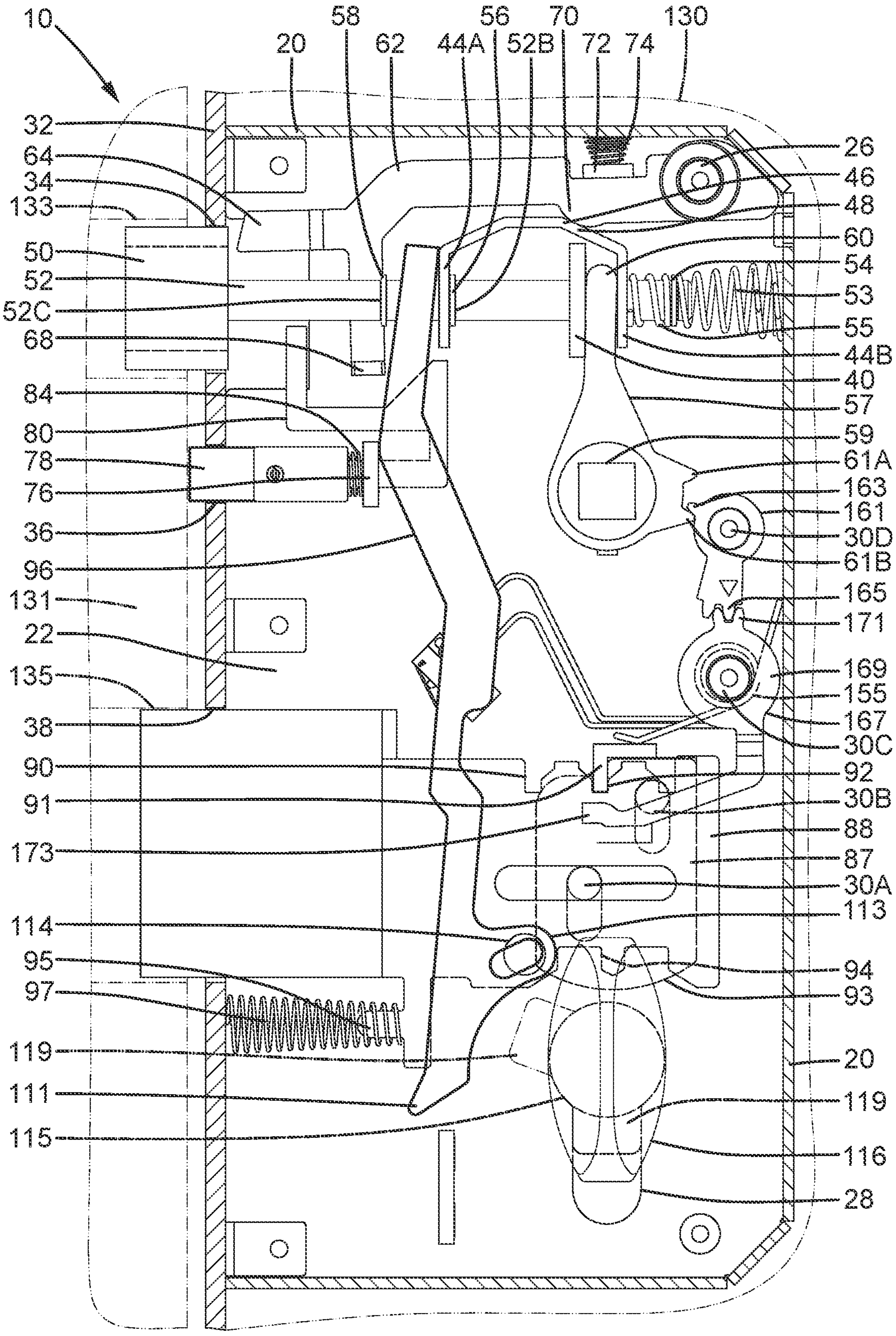
FIG. 7 is a cross sectional view of the lock case with the anti-theft latch moved to the anti-theft position.

Furthermore, a positioning spring 155 is disposed around the third limiting member 30C and located between the bottom wall 22 and the unlocking member 167. Two ends of the positioning spring 155 respectively abut against the lock case 20 and an upper end of the engaging portion 91, such that the slidable locking block 87 is biased to a position in which the engaging portion 91 engages with the recession 90 or the latching groove 92 (as shown in FIGS. 3 and 7).

The lock case 10 further includes an unlatching rod 96 pivotably received in the case body 20. The unlatching rod 96 includes a push portion 98 and a driven portion 111. The unlatching rod 96 further includes a coupling portion 113 between the push portion 98 and the driven portion 111. The push portion 98 is substantially U-shaped.

The coupling portion 113 of the unlatching rod 96 is pivotably coupled with a pin 114. The pin 114 is coupled with the extension portion 88 of the anti-theft latch 86 to move therewith. Thus, an end of the unlatching rod 96 adjacent to the driven portion 111 moves jointly with the anti-theft latch 86. The push portion 98 of the unlatching rod 96 is slidably coupled with the rod 52 of the latch 50. The push portion 98 is located between the first end 44A of the interlocking member 42 and the third retaining ring 58. Thus, pivotal movement of the unlatching rod 96 causes movement of the interlocking member 42.

The lock case 10 further includes a locking operation device 115 having a pivotable push block 119. The locking operation device 115 further includes a knob 116 interlocked with the push block 119 and a lock core 117 received therein. The knob 116 can be actuated to drive the push block 119 to pivot. The push block 119 can be pivoted only after a key is used to unlock the lock core 117.

The locking operation device 115 is coupled with the lock core hole 28 of the case body 20. The knob 116 is located on an indoor side. The lock core 117 is located on an outdoor side. The push block 119 is aligned with the lower end 93 of the slidable locking block 87, the extension portion 88 of the anti-theft latch 86, and the driven portion 111 of the unlatching rod 96 in the axial direction of the lock core hole 28.

The lock case 10 is mounted to an inner side of the door 130 pivotably mounted in a door frame 131, permitting the door 130 to pivot relative to the frame 131 to an open position and the closed position. Although not specifically shown, the lock case 10 according to the present invention may be used together with currently available inner and outer operating devices which are operatively coupled with the connecting hole 59 of the connecting member 57. Furthermore, when the outer operating device is set to a locking state, the outer operating device cannot drive the connecting member 57 to pivot and, thus, cannot move the latch 50 to the unlatching position. Thus, before the outer operating device is unlocked, the door 130 cannot be opened from the outside by the outer operating device.

Now that the basic construction of the lock case 10 of the present invention has been explained, the operation and some of the advantages of the lock case 10 can be set forth and appreciated. In particular, for the sake of explanation, it will be assumed that the door 130 is not closed (see FIG. 3), and the latch 50 is in the latching position. The push end 60 of the connecting member 57 abuts against the first supporting member and the second end 44B of the interlocking member 42. The stop portion 61B abuts against the first toothed portion 163 of the intermediate member 161. The anti-pick latch 78 is in the extended position. Thus, the limiting wall 82 of the follower member 80 abuts the interlocking end 68 of the anti-pick member 62. As a result, the anti-pick member 62 is retained in the non-anti-pick position, and the first abutting portion 70 is spaced from the push wall 44 of the interlocking member 42. Furthermore, the anti-theft latch 86 is in the non-anti-theft position, and the engaging portion 91 of the slidable locking block 87 is coupled with the recession 90 of the extension portion 88 of the anti-theft latch 86. Thus, the anti-theft latch 86 is retained in the non-anti-theft position. Furthermore, the driven portion 111 of the unlatching rod 96 is on the rotational path of the push block 119.

When the latch 50 is directly pressed to move towards the unlatching position while the door 130 is open and the anti-pick member 62 is in the non-anti-pick position, the latch 50 can move from the latching position to the unlatching position. Thus, w % ben the door 130 pivots towards the closed position, the latch 50 is pressed by the door frame 131 and moves to the unlatching position without moving the interlocking member 42. When the door 130 is completely closed, the latch 50 is aligned with a latch hole 133 in the door frame 131, and the first spring 53 returns the latch 50 to the latching position to engage with the latch hole 133 in the door frame 131, thereby retaining the door 130 in the closed position.

With reference to FIG. 4, with the door 130 in the closed state, the anti-pick latch 78 is pressed by the frame 131 to move from the extended position to the retracted position, such that the limiting wall 82 of the follower member 80 disengages from the interlocking end 68 of the anti-pick member 62. As a result, the anti-pick member 62 is biased by the third spring 74 to pivot from the non-anti-pick position to the anti-pick position. In this state, the first abutting portion 70 abuts against the lower end 48 of the push wall 44 of the interlocking member 42. Furthermore, the abutting end 64 of the anti-pick member 62 is on a path interfering with movement of the latch 50 from the unlatching position to the latching position.

Figure 5:
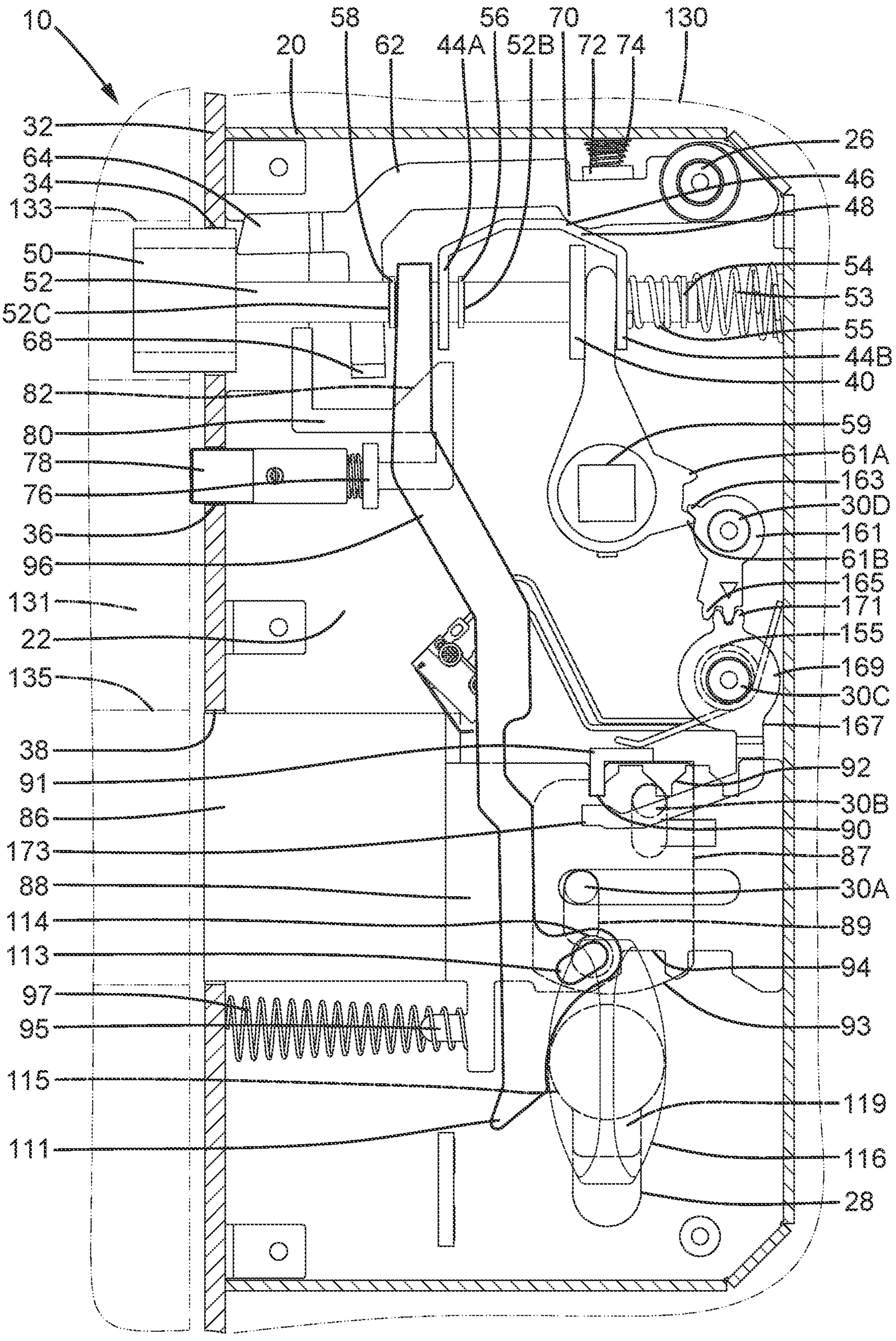
FIG. 5 is a cross sectional view of the lock case illustrating an anti-picking mechanism when a latch is picked.

In this state, when the outer operating device is set to the locking state, the outer operating device cannot be used to actuate the latch 50 to the unlatching position, such that the door 130 cannot be opened from the outside. In a case that a thief on the outside of the door 130 intends to pick the latch 50 via a gap between the door 130 and the door frame 131, since the interlocking member 42 can move relative to the latch 50, movement of the latch 50 cannot actuate the interlocking member 42, such that the anti-pick member 62 retains in the anti-pick position. With reference to FIG. 5, when the latch 50 moves along the path towards the unlatching position to a position abutting the abutting end 64 of the anti-pick member 62, the latch 50 cannot move further to the unlatching position, and the latch 50 still engages with the latch hole 131 of the door frame 131, avoiding unauthorized opening of the door 130.

Figure 6:
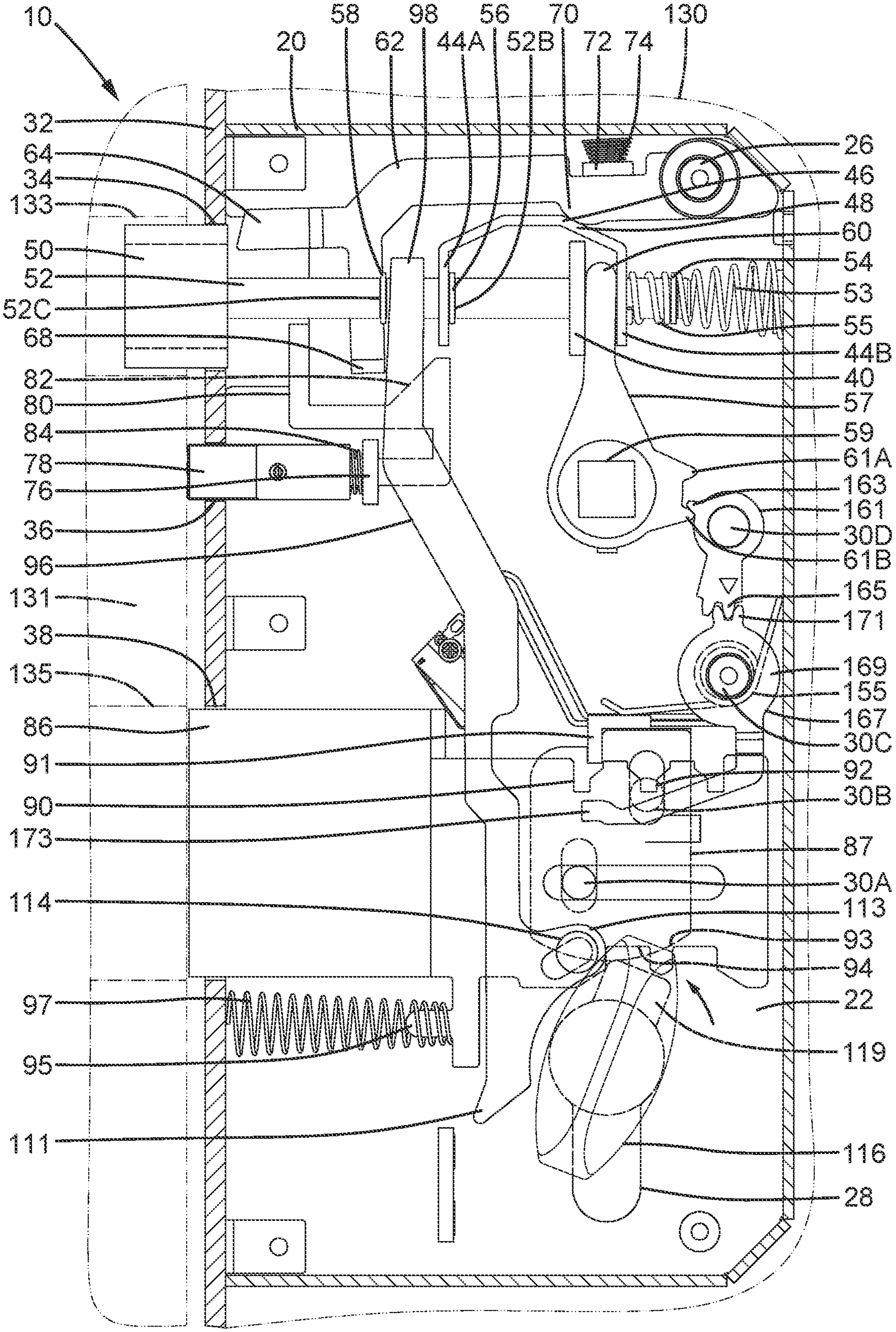
FIG. 6 is a cross sectional view illustrating pivotal movement of a locking operation device in a second direction to disengage an engaging portion of a slidable locking block from a recession and to move an anti-theft latch towards an anti-theft position.

The anti-theft effect of the door 130 can be enhanced by moving the anti-theft latch 86 to the anti-theft position. Specifically, the knob 116 or the lock core 117 (which must be operated by a key) can be pivoted to move the push block 119 in the counterclockwise direction (a second direction). With reference to FIG. 6, during the counterclockwise movement, the push block 119 firstly presses against the bottom end 93 of the slidable locking block 87. The slidable locking block 87 displaces and twists the positioning spring 155, causing disengagement of the engaging portion 91 from the recession 90. In this state, the anti-theft latch 86 is released and can displace. Further counterclockwise movement of the push block 119 presses against the actuating groove 94 of the extension portion 88, thereby pushing the anti-theft latch 86 from the non-anti-theft position to the anti-theft position. When the anti-theft latch 86 is in the anti-theft position, the unlocking spring 97 is compressed by the protrusion 95 cooperating with the end plate 32.

It is worth noting that when the locking operation device 115 is used to move the anti-theft latch 86 from the non-anti-theft position to the anti-theft position, since the connecting member 57 remains unmoved, the unlocking member 167 and the intermediate member 161 also remain unmoved when the slidable locking block 87 moves.

With reference to FIG. 7, when the anti-theft latch 86 is in the anti-theft position, the distal end of the anti-theft latch 86 engages with an anti-theft latch hole 135 of the door frame 131. Furthermore, with the anti-theft latch 86 in the anti-theft position, the push block 119 can be further pivoted counterclockwise (the second direction) to its original position. When the anti-theft latch 86 reaches the anti-theft position, the slidable locking block 87 returns to its original position under the action of the positioning spring 155. Thus, the engaging portion 91 engages with the latching groove 92 of the anti-theft latch 86, thereby retaining the anti-theft latch 86 in the anti-theft position.

With reference to FIGS. 4 and 7, the spacing between the driven portion 111 of the unlatching rod 96 and the push block 119 while the anti-theft latch 86 is in the non-anti-theft position is smaller than the spacing between the driven portion 111 of the unlatching rod 96 and the push block 119 while the anti-theft latch 86 is in the anti-theft position. Specifically, as shown in FIG. 4, when the anti-theft latch 86 is in the non-anti-theft position, the driven portion 111 of the unlatching rod 96 is on the rotational path of the push block 119, such that clockwise movement of the push block 119 can press against the driven portion 111 to pivot the unlatching rod %. As shown in FIG. 7, when the anti-theft latch 86 is in the anti-theft position, none of the clockwise movement (the first direction) and the counterclockwise movement (the second direction) of the push block 119 can press against the driven portion 111 of the unlatching rod 96.

When it is desired to move the anti-theft latch 86 from the anti-theft position to the non-anti-theft position, the knob 116 or the lock core 117 is moved to rotate the push block 119 in the clockwise direction (the first direction) without pressing against the driven portion 111 of the unlatching rod 96. Firstly, the push block 119 presses against the bottom end and moves the slidable locking block 87, and the engaging portion 91 disengages from the latching groove 92. Then, the push block 119 pushes the anti-theft latch 86 to move from the anti-theft position (FIG. 7) to the non-anti-theft position (FIG. 4), thereby disengaging the anti-theft latch 86 from the anti-theft latch hole 135.

Figure 8:
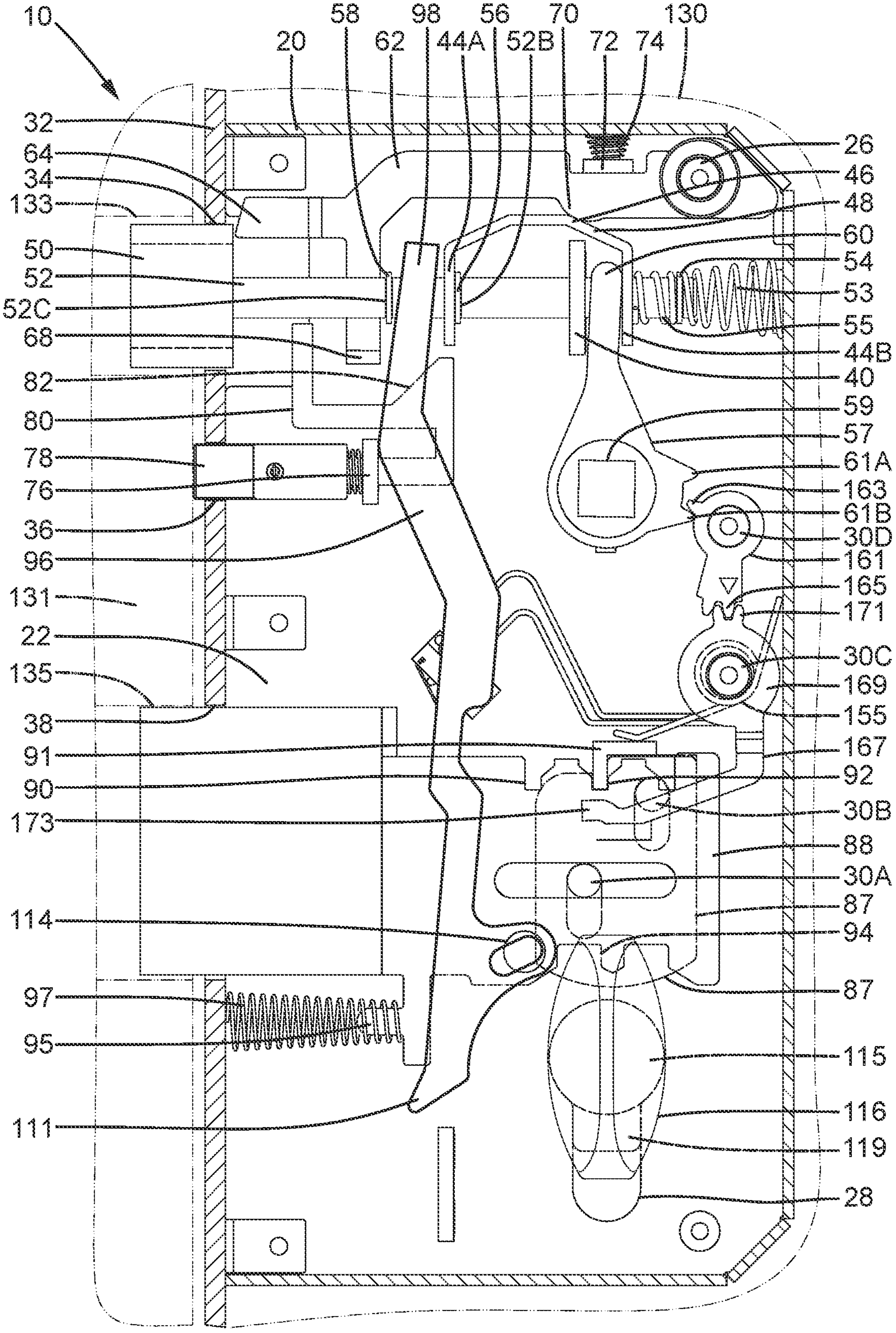
FIG. 8 is a cross sectional view of the lock case with a connecting member pushed by an inner operating device or an outer operating device to jointly move a follower member and the latch and with an anti-pick member in an anti-pick position.

With reference to FIGS. 4 and 8, with the door 130 closed and the anti-theft latch 86 in the anti-theft position, when it is desired to open the door 130 while the outer operating device is unlocked, the outer operating device or the inner operating device can be operated to drive the connecting member 57 to pivot in the clockwise direction. The push end 60 of the connecting member 57 presses against the second end 44B of the interlocking member 44, and the first end 44A of the interlocking member 42 presses against the second retaining ring 56. Thus, the interlocking member 42 and the latch 50 move jointly from the latching position (FIG. 4) to the unlatching position (FIG. 8).

At the first moment of the joint movement of the latch 50 and the interlocking member 42 towards the unlatching position, although the anti-pick member 62 is in the anti-pick position, after the latch 50 has moved a small distance towards the unlatching position but has not reached the abutting end 64 of the anti-pick member 62, movement of the interlocking member 42 causes the push wall 44 to move from a position (in which the lower end 48 is aligned with the first abutting portion 70 of the anti-pick member 62) to another position (in which the upper end 46 is aligned with the first abutting portion 70). Thus, before the latch 50 reaches the abutting end 64, the anti-pick member 62 is already in the non-anti-pick position. Furthermore, further clockwise movement of the connecting member 57 actuates the latch 50 and the interlocking member 42 to move jointly to the unlatching position.

During movement of the latch 50 from the latching position to the unlatching position in response to the pivotal movement of the connecting member 57, after the connecting member 57 pivots to a position in which the interlocking portion 61A presses against the first toothed portion 163 of the intermediate member 161, further clockwise movement of the connecting member 57 causes the intermediate member 161 to pivot in the counterclockwise direction, which, in turn, actuates the unlocking member 167 to pivot clockwise, and the actuating end 173 of the unlocking member 167 presses against the engaging portion 91 to thereby displace the slidable locking block 87. Thus, after the latch 50 approximately moves to the unlatching position, the engaging portion 91 completely disengages from the latching groove 92 of the anti-theft latch 86, such that the unlocking spring 97 biases the anti-theft latch 86 to return it from the anti-theft position to the non-anti-theft position. Therefore, the latch 50 is in the unlatching position and the anti-theft latch 86 is in the non-anti-theft position, permitting opening of the door 130.

Furthermore, when the inner or outer operating device is released after the door 130 is opened, the connecting member 57 returns in the counterclockwise direction to the position pressing against both the first supporting member 40 and the second end 44B. The intermediate member 161 and the unlocking member 167 are also returned. The slidable locking block 87 is biased and returned by the positioning spring 155 to a position in which the engaging portion 91 engages with the recession 90.

Furthermore, after the inner or outer operating device is released, the first spring 53 is compressed when the latch 50 moves to the unlatching position. When the connecting member 57 is released, the first spring 53 biases the first retaining ring 54 to move the latch 50 from the unlatching position to the unlatching position. The first retaining ring 54 presses against the second spring 55 which biases the second end 44B of the interlocking member 42 to thereby jointly move the interlocking member 42 and the latch 50 from the latching position to the unlatching position.

With reference to FIG. 4, when the latch 50 is in the latching position engaging with the latch hole 133 and the anti-theft latch 86 is in the non-anti-theft position, the inner or outer operating device can be used to pivot the connecting member 57, and the connecting member 57 actuates the interlocking member 42 to move the latch 50 from the latching position to the unlatching position, permitting opening of the door 130.

Apart from using the inner or outer operating device to actuate the connecting member 57 for independently moving the latch 50 to the unlatching position or additionally moving the anti-theft latch 86 to the non-anti-theft position, the locking operation device 115 of the lock case 10 can be used to cooperate with the unlatching rod 96 for moving the latch 50 to the unlatching position. With reference to FIG. 10, specifically, when the push block 119 pivots in the clockwise direction (the first direction) while the anti-theft latch 86 is in the non-anti-theft position, the push block 119 presses against the driven portion 111 of the unlatching rod 96, causing pivotal movement of the unlatching rod 96 about the pivotal axis defined by the pin 114. The push portion 98 of the unlatching rod 96 presses against the first end 44A of the interlocking member 42, causing joint movement of the interlocking member 42 and the latch 50 towards the unlatching position. The anti-pick member 62 is also pressed by the push wall 44 to move from the anti-pick position to the non-anti-pick position, such that the door 130 can be opened when the latch 50 reaches the unlatching position.

The anti-theft latch 86 can be moved from the anti-theft position to the non-anti-theft position by the locking operation device 115 in addition to the inner or outer operating device. Specifically, with reference to FIG. 7, with the anti-theft latch 86 in the anti-theft position, when the push block 119 is pushed in the clockwise direction (the first direction), the push block 119 firstly presses against the bottom end 93 to displace the slidable locking block 87, thereby disengaging the engaging portion 91 from the latching groove 92. Further clockwise movement of the push block 119 presses against the actuating groove 94 to cause pivotal movement of the anti-theft latch 86 from the anti-theft position to the non-anti-theft position.

By provision of the unlocking member 167 interlocked with the intermediate member 161 and the connecting member 57 and cooperation of the unlatching spring 97, when the outer operating device (which can interlock with the lock case 10 only when in the unlocked state) or the inner operating device to open the door 130, the latch 50 is moved to the unlatching position while the anti-theft latch 86 is moved to the non-anti-theft position, which does not require separate operation for moving the anti-theft latch 86 to the non-anti-theft position, providing convenient use.

It is worth noting that since the inner operating device is generally mounted to the indoor side without the need of locking, the inner operating device is normally set in a state permitting direct operation for moving the latch 50 to the unlatching position while moving the anti-theft latch 86 to the non-anti-theft position. Meanwhile, the outer operating device mounted to the outdoor side cannot be used to interlock the lock case 10 when the outer operating device is locked through an additional locking mechanism. Therefore, the lock case 10 according to the present invention provides both convenience and excellent anti-theft effect.

According to the present invention, by provision of the anti-pick latch 78 cooperating with the interlocking member 42 and the anti-pick member 62, when the door 130 is closed, the anti-pick member 62 automatically moves to the anti-pick position. When the latch 50 is picked (with the intention to move the latch 50 to the unlatching position), the interlocking member 42 remains unmoved, such that the anti-pick member 62 remains in the anti-pick position. Thus, the latch 50 cannot move to the unlatching position, and the door 130 cannot be opened.

By provision of the push wall 44 of the interlocking member 42, when the interlocking member 42 and the latch 50 move jointly towards the unlatching position, the anti-pick member 62 is pressed by the push wall 44 of the interlocking member 42 to pivot to the non-anti-pick position before the latch 50 presses against the abutting end 64 of the anti-pick member 62. Thus, the latch 50 can be moved to the unlatching position by the connecting member 57 and the unlatching rod 96 which pushes the interlocking member 42.

The first spring 53 is used to return the latch 50 from the unlatching position to the latching position, and the second spring 55 biases the second end 44B of the interlocking member 42, such that the latch 50 can move independently relative to the interlocking member 42 or the latch 50 and the interlocking member 42 can move jointly during which the relative position therebetween is maintained. This assures that the anti-pick member 62 can move to the anti-pick position or the non-anti-pick position at the proper timing.

By provision of the limiting wall 82 of the anti-pick latch 78 cooperating with the interlocking end 68 of the anti-pick member 62, when the door 130 is in the open position, the anti-pick member 62 is reliably retained in the non-anti-pick position, such that the latch 50 can be directly pressed by the door frame 131 to move to the unlatching position without moving the interlocking member 42. Thus, the door 130 can be closed completely, and the anti-pick member 62 automatically moves to the anti-pick position when the door 130 is in the closed position.

Now that the basic teachings of the present invention have been explained, many extensions and variations will be obvious to one having ordinary skill in the art. For example, the lock case 10 does not have to include the anti-pick member 62, the interlocking member 42, and the anti-pick latch 78. In this case, when the anti-theft latch 86 is in the anti-theft position, even if the latch 50 is picked to and moved to the unlatching position, the door 130 still cannot be opened.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A lock case comprising:

a case body;

a latch movably coupled to the case body and movable between a latching position and an unlatching position;

an interlocking member operatively coupled with the latch and including a push wall, wherein the push wall includes an upper end and a lower end;

an anti-pick member pivotably mounted to the case body and including a first abutting portion, wherein the anti-pick member is pivotable between an anti-pick position and a non-anti-pick position;

an anti-pick latch movably coupled to the case body and operatively connected to the anti-pick member, wherein the anti-pick latch is movable between an extended position and a retracted position, wherein when the anti-pick latch is in the extended position, the first abutting portion is spaced from the push wall of the interlocking member, and the anti-pick member remains in the non-anti-pick position, and wherein when the anti-pick latch is in the retracted position, the first abutting portion abuts against the push wall, and the anti-pick member is pivotable to the anti-pick position or the non-anti-pick position;

a connecting member pivotably connected to the case body and operatively connected to the interlocking member, wherein pivotal movement of the connecting member actuates the interlocking member and the latch to move jointly between the latching position and the unlatching position, wherein when the latch is in the latching position and the anti-pick latch is in the retracted position, the anti-pick member is in the anti-pick position and the first abutting portion abuts the lower end of the push wall, wherein when the latch is in the latching position and the anti-pick latch is in the retracted position, the anti-pick member is in the non-anti-pick position and the first abutting portion abuts the upper end of the push wall, and wherein with the anti-pick member in the anti-pick position and the connecting member not pivoted, the interlocking member remains unmoved when the latch is picked to move from the latching position towards the unlatching position, such that the anti-pick member remains in the anti-pick position, preventing the latch from moving from the latching position to the unlatching position;

the anti-pick latch movably coupled to the case body and movable between an anti-theft position and a non-anti-theft position;

an unlocking spring disposed in the case body and biasing the anti-theft latch towards the non-anti-theft position;

a slidable locking block movably coupled to the case body, wherein with the slidable locking block engaged with the anti-theft latch, the slidable locking block retains the anti-theft latch in the anti-theft position or the non-anti-theft position, wherein with the slidable locking block disengaged from the anti-theft latch 86, the anti-theft latch is permitted to move to the anti-theft position or the non-anti-theft position;

an intermediate member pivotably mounted in the case body and interlocked with the connecting member; and an unlocking member interlocked with the intermediate member and operatively connected to the slidable locking block, wherein when the connecting member pivots and the latch moves from the latching position to the unlatching position, the unlocking member actuates the slidable locking block to disengage from the anti-theft latch, and the unlocking spring biases the anti-theft latch to move from the anti-theft position to the non-anti-theft position.

2. The lock case as claimed in claim 1, further comprising a first spring, wherein the latch includes a rod extending therefrom, wherein first, second, and third retaining rings are disposed on the rod, wherein the second retaining ring is disposed between the first retaining ring and the third retaining ring, wherein the first spring is disposed between the first retaining ring and the case body and biases the latch to the latching position, wherein the interlocking member further includes first and second ends slidably coupled with the rod, wherein the first end of the interlocking member is located between the second and third retaining rings, and abuts the second retaining ring, wherein the second end of the interlocking member is disposed between the first and second retaining rings and abuts the connecting member, wherein when the interlocking member moves towards the first retaining ring, the first end of the interlocking member presses against the second retaining ring to move the latch from the latching position to the unlatching position, and wherein with the connecting member not pivoted and the anti-pick member in the anti-pick position, when the latch is picked to move from the latching position to the unlatching position, the second retaining ring moves away from the first end of the interlocking member, such that the interlocking member remains unmoved to reliably retain the anti-pick member in the anti-pick position.

3. The lock case as claimed in claim 2, further comprising a second spring disposed between the second end of the interlocking member and the first retaining ring, wherein the second spring biases the interlocking member, and wherein with the anti-pick member in the anti-pick position and the connecting member not pivoted, when the latch is picked to move from the latching position towards the unlatching position, movement of the first retaining ring compresses the first spring, the second spring keeps the second end of the interlocking member to abut against the connecting member without movement, reliably retaining the anti-pick member in the anti-pick position.

4. The lock case as claimed in claim 1, further comprising:

an unlatching rod including a push portion, a driven portion, and a coupling portion between the push portion and the driven portion, wherein the push portion is adjacent to the interlocking member, and wherein the coupling portion is operatively connected to the anti-theft latch; and a locking operation device mounted to the case body and including a push block operatively connected to a lock core, wherein when the anti-theft latch is in the anti-theft position, the driven portion of the unlatching rod is outside of the rotational path of the push block, wherein when the anti-theft latch is in the non-anti-theft position, the driven portion of the unlatching rod is on the rotational path of the push block, wherein with the anti-theft latch in the non-anti-theft position and the connecting member remained unmoved, when the lock core is unlocked and drives the push block to pivot in the first direction, the driven portion of the unlatching rod is pressed, and the push portion of the unlatching rod presses against and actuates the interlocking member to thereby move the latch from the latching position to the unlatching position, wherein with the anti-theft latch in the non-anti-theft position and the connecting member remained unmoved, when the lock core is unlocked and drives the push block to pivot in a second direction reverse to the first direction, the sliding locking block is actuated to disengage from the anti-theft latch, and the anti-theft latch moves from the non-anti-theft position to the anti-theft position, and wherein with the anti-theft latch in the anti-theft position and the connecting member remained unmoved, when the lock core is unlocked and drives the push block to pivot in the first direction, the slidable locking block disengages from the anti-theft latch, and the anti-theft latch moves from the anti-theft position to the non-anti-theft position.

5. The lock case as claimed in claim 1, further comprising a third spring, wherein the anti-pick member further includes a second abutting portion spaced from the first abutting portion, and wherein the third spring is disposed between the second abutting portion and the case body and biases the anti-pick member towards the anti-pick position.

6. The lock case as claimed in claim 1, wherein the anti-pick member further includes an interlocking end, wherein the anti-pick latch further includes a follower member having a limiting wall, wherein when the anti-pick latch is in the extended position, the limiting wall abuts against the interlocking end to remain the anti-pick member in the anti-pick position, and the first abutting portion is spaced from the push wall, and wherein when the anti-pick latch is in the retracted position, the limiting wall is spaced from the interlocking end, and the first abutting portion abuts the first wall.

7. The lock case as claimed in claim 1, further comprising: a locking operation device mounted to the case body, wherein the locking operating device includes a push block, wherein the slidable locking block includes a bottom end adjacent to the push block, wherein the anti-theft latch further includes an extension portion, wherein the extension portion includes a side having a recession and a latching groove, wherein the extension portion further includes another side having an actuating groove, wherein the slidable locking block further includes an engaging portion selectively coupled with one of the recession and the latching groove, wherein when the anti-theft latch is in the non-anti-theft position and the push block rotates in the second direction, the push block presses against the bottom end of the slidable locking block to move the slidable locking block to a position in which the engaging portion disengage from the recession, the unlocking member, the intermediate member, and the connecting member remain unmoved, and the anti-theft latch moves from the non-anti-theft position to the anti-theft position, wherein when the anti-theft latch is in the anti-theft position and the push block rotates in the first direction, the push block presses against the bottom end of the slidable locking block to move the slidable locking block to a position in which the engaging portion disengage from the latching groove, the unlocking member, the intermediate member, and the connecting member remain unmoved, and the anti-theft latch moves from the anti-theft position to the non-anti-theft position, wherein when the anti-theft latch is in the anti-theft position and the connecting member pivots to move the latch to the unlatching position, the engaging portion disengages from the latching groove to move the anti-theft latch from the anti-theft position to the non-anti-theft position.

8. The lock case as claimed in claim 7, wherein the extension portion further includes a protrusion, and wherein the unlatching spring is disposed between the case body and the protrusion.

9. The lock case as claimed in claim 7, wherein the connecting member includes an interlocking portion on an outer periphery thereof, wherein the intermediate member further includes a first toothed portion and a second toothed portion spaced from the first toothed portion in a circumferential direction about a pivotal axis of the intermediate member, wherein the unlocking member includes a meshing portion meshed with the second toothed portion, wherein the unlocking member further includes an actuating end adjacent to the engaging portion, wherein when the connecting member pivots and the latch moves from the latching position to the unlatching position, the interlocking portion pushes the first toothed portion to pivot the intermediate member, the second toothed portion actuates the meshing portion to pivot the unlocking member, the actuating end actuates the engaging portion to disengage from the recession or the latching groove, and wherein when the connecting member pivots and the latch moves from the unlatching position to the latching position, the engaging portion moves to a position engaged with the recession.

10. The lock case as claimed in claim 9, wherein the connecting member further includes a stop portion spaced from the interlocking portion in a circumferential direction about a pivotal axis of the connecting member, wherein when the latch is in the latching position and the connecting member does not pivot, the stop portion abuts against the first toothed portion of the intermediate member, the interlocking portion is spaced from the first toothed portion in the circumferential direction about the pivotal axis of the connecting member, wherein during movement of the latch from the latching position to the unlatching position caused by pivotal movement of the connecting member, the intermediate member pivots after the interlocking portion presses against the first toothed portion.

11. The lock case as claimed in claim 1, further comprising: a positioning spring disposed in the case body, wherein the positioning spring biases the engaging portion of the slidable locking block to retain in a position engaged with the recession or the latching groove.

12. A lock case comprising:

a case body;

a latch movably coupled to the case body and movable between a latching position and an unlatching position;

a connecting member pivotably connected to the case body, wherein pivotal movement of the connecting member actuates the latch to move between the latching position and the unlatching position, an anti-theft latch movably coupled to the case body and movable between an anti-theft position and a non-anti-theft position;

an unlocking spring disposed in the case body and biasing the anti-theft latch towards the non-anti-theft position;

a slidable locking block movably coupled to the case body, wherein when the slidable locking block engages with the anti-theft latch, the slidable locking block retains the anti-theft latch in the anti-theft position or the non-anti-theft position, wherein when the slidable locking block disengages from the anti-theft latch, the anti-theft latch is movable from the anti-theft position to the non-anti-theft position or from the non-anti-theft position to the anti-theft position;

an intermediate member pivotably mounted in the case body and interlocked with the connecting member; and an unlocking member interlocked with the intermediate member and operatively connected to the slidable locking block, wherein when the connecting member pivots and the latch moves from the latching position to the unlatching position, the intermediate member actuates the unlocking member to pivot, which, in turn, actuates the slidable locking block to disengage from the anti-theft latch, wherein when the anti-theft latch is in the anti-theft position, the unlocking spring biases the anti-theft latch to move from the anti-theft position to the non-anti-theft position, wherein when the connecting member pivots and the latch moves from the unlatching position to the latching position, the slidable locking block moves to a position engaged with the anti-theft latch to retain the anti-theft latch in the non-anti-theft position.

13. The lock case as claimed in claim 12, further comprising:

an unlatching rod including a push portion, a driven portion, and a coupling portion between the push portion and the driven portion, wherein the push portion is operatively coupled with the latch, and wherein the coupling portion is operatively connected to the anti-theft latch; and a locking operation device mounted to the case body and including a push block operatively connected to a lock core, wherein with the anti-theft latch 86 in the non-anti-theft position and the connecting member unmoved, w % ben the lock core is unlocked and drives the push block to pivot in a first direction, the driven portion is pressed to pivot the unlatching rod, thereby moving the latch from the latching position to the unlatching position, and wherein with the anti-theft latch in the anti-theft position, pivotal movement of the push block does not press against the driven portion, the unlatching rod remains unmoved, and the latch is retained in the latching position.

14. The lock case as claimed in claim 12, further comprising: a locking operation device mounted to the case body, wherein the locking operating device includes a push block, wherein the slidable locking block includes a bottom end adjacent to the push block, wherein the anti-theft latch further includes an extension portion, wherein the extension portion includes a side having a recession and a latching groove, wherein the extension portion further includes another side having an actuating groove, wherein the slidable locking block further includes an engaging portion selectively coupled with one of the recession and the latching groove, wherein when the anti-theft latch is in the non-anti-theft position and the push block rotates in the second direction, the push block presses against the bottom end of the slidable locking block to move the slidable locking block to a position in which the engaging portion disengage from the recession, the unlocking member, the intermediate member, and the connecting member remain unmoved, and the anti-theft latch moves from the non-anti-theft position to the anti-theft position, wherein whine the anti-theft latch is in the anti-theft position and the push block rotates in the first direction, the push block presses against the bottom end of the slidable locking block to move the slidable locking block to a position in which the engaging portion disengage from the latching groove, the unlocking member, the intermediate member, and the connecting member remain unmoved, and the anti-theft latch moves from the anti-theft position to the non-anti-theft position, wherein when the anti-theft latch is in the anti-theft position and the connecting member pivots to move the latch to the unlatching position, the engaging portion disengages from the latching groove to move the anti-theft latch from the anti-theft position to the non-anti-theft position.

15. The lock case as claimed in claim 14, wherein the extension portion further includes a protrusion, and wherein the unlatching spring is disposed between the case body and the protrusion.

16. The lock case as claimed in claim 14, wherein the connecting member includes an interlocking portion on an outer periphery thereof, wherein the intermediate member further includes a first toothed portion and a second toothed portion spaced from the first toothed portion in a circumferential direction about a pivotal axis of the intermediate member, wherein the unlocking member includes a meshing portion meshed with the second toothed portion, wherein the unlocking member further includes an actuating end adjacent to the engaging portion, wherein when the connecting member pivots and the latch moves from the latching position to the unlatching position, the interlocking portion pushes the first toothed portion to pivot the intermediate member, the second toothed portion actuates the meshing portion to pivot the unlocking member, the actuating end actuates the engaging portion to disengage from the recession or the latching groove, and wherein when the connecting member pivots and the latch moves from the unlatching position to the latching position, the engaging portion moves to a position engaged with the recession.

17. The lock case as claimed in claim 16, wherein the connecting member further includes a stop portion spaced from the interlocking portion in a circumferential direction about a pivotal axis of the connecting member, wherein when the latch is in the latching position and the connecting member does not pivot, the stop portion abuts against the first toothed portion of the intermediate member, the interlocking portion is spaced from the first toothed portion in the circumferential direction about the pivotal axis of the connecting member, wherein during movement of the latch from the latching position to the unlatching position caused by pivotal movement of the connecting member, the intermediate member pivots after the interlocking portion presses against the first toothed portion.

18. The lock case as claimed in claim 12, further comprising: a positioning spring disposed in the case body, wherein the positioning spring biases the engaging portion of the slidable locking block to retain in a position engaged with the recession or the latching groove.

* * * * *